US009328027B2

(12) United States Patent
Kripavicius

(10) Patent No.: US 9,328,027 B2
(45) Date of Patent: May 3, 2016

(54) FAST-CURING PERVIOUS CONCRETE MIX

(71) Applicant: Edward Kripavicius, Corona, CA (US)

(72) Inventor: Edward Kripavicius, Corona, CA (US)

(73) Assignee: Hanson Aggregates LLC, Irving, TX (US)

( * ) Notice: Subject to any disclaimer, the term of this patent is extended or adjusted under 35 U.S.C. 154(b) by 0 days.

(21) Appl. No.: 14/134,659

(22) Filed: Dec. 19, 2013

(65) Prior Publication Data

US 2014/0187680 A1 Jul. 3, 2014

Related U.S. Application Data

(60) Provisional application No. 61/740,863, filed on Dec. 21, 2012.

(51) Int. Cl.
| | | |
|---|---|---|
| C04B 38/00 | (2006.01) | |
| C04B 14/38 | (2006.01) | |
| C04B 26/04 | (2006.01) | |
| C04B 28/04 | (2006.01) | |
| C04B 111/00 | (2006.01) | |

(52) U.S. Cl.
CPC ............... *C04B 38/00* (2013.01); *C04B 26/04* (2013.01); *C04B 28/04* (2013.01); *C04B 2111/00284* (2013.01); *Y02W 30/92* (2015.05)

(58) Field of Classification Search
CPC ............................ C04B 14/38; C04B 2111/40
See application file for complete search history.

(56) References Cited

U.S. PATENT DOCUMENTS

| | | |
|---|---|---|
| 666,077 A | 1/1901 | Walters |
| 2,793,957 A | 5/1957 | Mangold et al. |
| 3,351,478 A | 11/1967 | Dodson et al. |
| 3,416,276 A | 12/1968 | Caputo et al. |
| 3,712,825 A | 1/1973 | Yocum |
| 3,847,630 A | 11/1974 | Compernass et al. |
| 4,205,993 A | 6/1980 | Rosenberg et al. |
| 4,210,457 A | 7/1980 | Dodson et al. |
| 4,225,357 A | 9/1980 | Hodson |
| 4,318,744 A | 3/1982 | Dodson |
| 4,336,069 A | 6/1982 | Dodson et al. |
| 4,410,366 A | 10/1983 | Birchall et al. |
| 4,946,504 A | 8/1990 | Hodson |
| 4,948,429 A | 8/1990 | Arfaei |
| 4,964,917 A | 10/1990 | Bobrowski et al. |
| 4,978,392 A | 12/1990 | Kilbarger et al. |
| 5,026,609 A | 6/1991 | Jacob et al. |
| 5,030,502 A | 7/1991 | Teare |
| 5,203,629 A | 4/1993 | Valle et al. |
| 5,203,919 A | 4/1993 | Bobrowski et al. |
| 5,232,587 A | 8/1993 | Hegemier et al. |
| 5,284,580 A | 2/1994 | Shyh |
| 5,294,256 A | 3/1994 | Weigand et al. |
| 5,326,396 A | 7/1994 | Abdelrazig et al. |
| 5,350,554 A | 9/1994 | Miller |
| 5,427,617 A | 6/1995 | Bobrowski et al. |
| 5,478,391 A | 12/1995 | Babaev et al. |
| 5,494,516 A | 2/1996 | Drs et al. |
| 5,632,888 A | 5/1997 | Chinn et al. |
| 5,665,158 A | 9/1997 | Darwin et al. |
| 5,720,574 A | 2/1998 | Barella |
| 5,725,782 A | 3/1998 | Chinn et al. |
| 5,753,368 A | 5/1998 | Berke et al. |
| 5,776,243 A | 7/1998 | Goodson et al. |
| 5,779,788 A | 7/1998 | Berke et al. |
| 5,785,751 A | 7/1998 | Bashlykov et al. |
| 5,788,407 A | 8/1998 | Hwang |
| 5,820,762 A | 10/1998 | Bamer et al. |
| 5,849,198 A | 12/1998 | Sharpless |
| 5,916,361 A | 6/1999 | Molloy et al. |
| 5,985,989 A | 11/1999 | Shawl et al. |
| 6,010,622 A | 1/2000 | Chinn et al. |
| 6,079,175 A | 6/2000 | Clear |
| 6,080,307 A | 6/2000 | Morris et al. |
| 6,103,783 A | 8/2000 | Hong |
| 6,106,707 A | 8/2000 | Morris et al. |
| 6,187,409 B1 | 2/2001 | Mathieu |
| 6,277,191 B1 | 8/2001 | Budiansky et al. |
| 6,277,274 B1 | 8/2001 | Coffman |
| 6,287,459 B1 | 9/2001 | Williamson |
| 6,302,621 B1 | 10/2001 | Miya et al. |
| 6,368,499 B1 | 4/2002 | Sharpless |

(Continued)

FOREIGN PATENT DOCUMENTS

| | | | |
|---|---|---|---|
| CN | 101580364 A | * | 11/2009 |
| GB | 938567 | | 10/1963 |

(Continued)

OTHER PUBLICATIONS

CN 101580364, as abstracted by Derwent (Acc No. 2009-R79170, 2009).*
BASF (Making Pervious Concrete Placement Easy: Using a Novel Admixture System. BASF Admixtures, Inc. 2006, 5 pages).*
Machine translated English language equivalent of JP 2010-111538 (May 2010, 22 pages).*
International Search Report corresponding to application No. PCT/US2013/076804, dated Apr. 14, 2014.
Grace Construction Products, "Pervious Concrete Mix Proportioning," Technical Bulletin TB-0111, 2006, pp. 1-2.

(Continued)

*Primary Examiner* — Brieann R Fink
(74) *Attorney, Agent, or Firm* — RatnerPrestia

(57) ABSTRACT

A fast-curing pervious concrete mix made by combining: water; a cementitious material comprising portland cement and a supplementary cementitious material; aggregate sized to form a pervious concrete; a water reducer; a quantity of fibers; and a polymeric bonding agent, the mix curing to a compressive strength of at least 2,000 psi within 24 hours of placement. Also, a method of forming a pervious concrete structure by forming the fast-curing pervious concrete mix, placing the mix in a desired formation, and curing the placed mix, and a pervious concrete obtained by placing and curing the fast-curing pervious concrete mix.

21 Claims, No Drawings

(56) References Cited

U.S. PATENT DOCUMENTS

| | | | |
|---|---|---|---|
| 6,531,059 B1 | 3/2003 | Morris et al. | |
| 6,551,505 B2 | 4/2003 | Chinn et al. | |
| 6,569,321 B2 | 5/2003 | Coffman | |
| 6,660,077 B2 | 12/2003 | De Buen-Unna et al. | |
| 6,719,910 B1 | 4/2004 | Thiem et al. | |
| 6,749,366 B1 | 6/2004 | Chinn et al. | |
| 6,758,897 B2 | 7/2004 | Rieder et al. | |
| 6,767,160 B2 | 7/2004 | Sansalone | |
| 6,773,646 B2 | 8/2004 | Rieder et al. | |
| 6,797,162 B2 | 9/2004 | Happel | |
| 6,824,605 B2 | 11/2004 | De Buen-Unna et al. | |
| 6,863,969 B2 | 3/2005 | Rieder et al. | |
| 6,872,029 B2 | 3/2005 | Allard et al. | |
| 6,875,265 B1 | 4/2005 | Kang | |
| 6,884,343 B2 | 4/2005 | Harris et al. | |
| 6,905,289 B1 | 6/2005 | Sanguinetti | |
| 7,037,367 B2 | 5/2006 | Mauchamp et al. | |
| 7,080,480 B2 | 7/2006 | Urban et al. | |
| 7,083,721 B2 | 8/2006 | McClure et al. | |
| 7,094,338 B2 | 8/2006 | Morris et al. | |
| 7,128,781 B1 | 10/2006 | Piazza | |
| 7,147,706 B1 | 12/2006 | Piazza | |
| 7,270,747 B2 | 9/2007 | Happel et al. | |
| 7,294,256 B2 | 11/2007 | Happel et al. | |
| 7,300,892 B2 | 11/2007 | Porter | |
| 7,316,743 B2 * | 1/2008 | Cangiano | 106/713 |
| 7,396,495 B2 | 7/2008 | Friesner | |
| 7,442,248 B2 * | 10/2008 | Timmons | 106/705 |
| 7,462,236 B2 | 12/2008 | Chun et al. | |
| D596,697 S | 7/2009 | Siviter et al. | |
| 7,575,393 B2 | 8/2009 | Sansalone | |
| 7,625,485 B2 | 12/2009 | Siviter et al. | |
| 7,632,403 B2 | 12/2009 | Dierkes | |
| 7,638,066 B1 | 12/2009 | Jacob et al. | |
| 7,833,412 B2 | 11/2010 | Holtz | |
| 7,837,868 B2 | 11/2010 | Jacob et al. | |
| 7,922,916 B1 | 4/2011 | Witt | |
| 7,981,283 B2 | 7/2011 | Happel | |
| 2002/0031402 A1 | 3/2002 | French | |
| 2002/0055558 A1 | 5/2002 | Maehara et al. | |
| 2002/0057944 A1 | 5/2002 | Adams et al. | |
| 2002/0073898 A1 | 6/2002 | Schelinski | |
| 2002/0117086 A1 * | 8/2002 | Shi et al. | 106/672 |
| 2003/0047502 A1 | 3/2003 | Roberts et al. | |
| 2003/0061970 A1 | 4/2003 | De Buen-Unna et al. | |
| 2003/0150362 A1 | 8/2003 | De Buen-Unna et al. | |
| 2006/0157423 A1 | 7/2006 | Cleary | |
| 2006/0159517 A1 | 7/2006 | Hagerman et al. | |
| 2006/0163147 A1 | 7/2006 | Dierkes et al. | |
| 2006/0237369 A1 | 10/2006 | Kirts et al. | |
| 2007/0056480 A1 * | 3/2007 | Gray | 106/819 |
| 2008/0023404 A1 | 1/2008 | Majersky | |
| 2008/0023408 A1 | 1/2008 | Hansen | |
| 2008/0058461 A1 | 3/2008 | Cummins | |
| 2008/0121579 A1 | 5/2008 | Dierkes | |
| 2008/0121594 A1 | 5/2008 | Dierkes | |
| 2008/0245710 A1 | 10/2008 | Mitchell et al. | |
| 2009/0039022 A1 | 2/2009 | Belasco | |
| 2009/0071376 A1 | 3/2009 | Masloff et al. | |
| 2009/0180833 A1 | 7/2009 | Buch | |
| 2009/0235845 A1 * | 9/2009 | Wantling | 106/660 |
| 2009/0314723 A1 | 12/2009 | Jacob et al. | |
| 2010/0025313 A1 | 2/2010 | Dierkes | |
| 2010/0043673 A1 | 2/2010 | Batoz et al. | |
| 2010/0051525 A1 | 3/2010 | Jacob et al. | |
| 2010/0058957 A1 | 3/2010 | Boxley | |
| 2010/0108617 A1 | 5/2010 | Schmidt et al. | |
| 2010/0150654 A1 | 6/2010 | Shaw et al. | |
| 2010/0229714 A1 * | 9/2010 | Tonyan et al. | 89/36.02 |
| 2010/0285224 A1 | 11/2010 | Fisher | |
| 2011/0003904 A1 * | 1/2011 | Guevara et al. | 521/59 |
| 2011/0064517 A1 | 3/2011 | Sader | |
| 2011/0230598 A1 * | 9/2011 | Sorger et al. | 524/5 |
| 2011/0247973 A1 | 10/2011 | Sargand et al. | |
| 2011/0250013 A1 | 10/2011 | Buch | |
| 2011/0274488 A1 | 11/2011 | Novick et al. | |
| 2012/0111236 A1 * | 5/2012 | Constantz et al. | 106/709 |
| 2012/0172469 A1 * | 7/2012 | Perez-Pena | 521/83 |
| 2013/0167756 A1 * | 7/2013 | Chen et al. | 106/706 |
| 2014/0090842 A1 * | 4/2014 | Patil et al. | 166/293 |

FOREIGN PATENT DOCUMENTS

| | | |
|---|---|---|
| GB | 1167760 | 10/1969 |
| JP | 2005-262728 | 9/2005 |
| JP | 2010111538 A * | 5/2010 |
| KR | 10-2005-0031097 | 4/2005 |

OTHER PUBLICATIONS

Schaefer, et al., "Mix Design Development for Pervious Concrete in Cold Weather Climates," Center for Transportation Research and Education, Iowa State University, Feb. 2006, pp. XI-45.
American Concrete Institute, "Specification for Pervious Concrete Pavement, an ACI Standard", ACI 522.1-08, Mar. 2008, pp. 1-11.
Blackburn, Rick, "Pervious Concrete, Practical Application of Pervious Concrete: Mix Designs that are Workable," NRMCA Conference, Axim Italcementi Group, May 2006, pp. 1-20.
"Mix Design and Materials," Pervious Concrete, When it Rains . . . it Drains, http://www.perviouspavement.org/mixture_proportioning.htm, retrieved Mar. 25, 2011, pp. 1-4.
National Concrete Pavement Technology Center, "Mix Design Development for Pervious Concrete in Cold Weather Climates," Feb. 2006, pp. 1-3.
Youngs, Andy, "Pervious Concrete the California Experience," pp. 1-6.
IRMCA Indiana Ready Mixed Concrete Associations, "IRMCA Pervious Concrete—Key Points," pp. 1-7.
Tennis et al., "Pervious Concrete Pavements," Portland Cement Associations, National Ready Mixed Concrete Association, 2004, pp. i-28.
Portland Cement Association, "Cement & Concrete Basics, Frequently Asked Questions," http://www.cement.org/basics/concretebasics_faqs.asp, retrieved Mar. 25, 2011.
Halverson, et al., "Void Continuity Index for Pervious Concretes Using X-Ray Computed Tomography Scanning," pp. 50-67.
Propex Concrete Systems, "Fibermesh 150 Product Data Sheet," 2007, pp. 1-2.
"Propex Material Safety Data Sheet, Polypropylene Fibers for Concrete Reinforcement," pp. 1-6.
Bhutta, et al., "Recent Status of Research and Development of Concrete-Polymer Composites in Japan," Concrete Research letters, vol. 1(4), Dec. 2010, pp. 125-130.
NPCPA, Mix Design Calculator, http://2.bp.blogspot.com/_KxIFNLYCX_Y/TUG9j3YLnzI/AAAAAAAAAD0/64jyxY8GZYc/s1600/Calculator.JPG, 2011, p. 1.
"Silicon Dioxide," Wikipedia, http://en.wikipedia.org/wiki/Silicon_dioxide, retrieved Sep. 21, 2011, pp. 1-13.
Grace Construction Products, "Using V-MAR 3 (Rheology Modifying Admixture) to Reduce Concrete Pump Pressure," Technical Bulletin TB-1402, 2005, pp. 1-4.
Grace Concrete Products, "WRDA 64 Water-reducing admixture, ASTM C494 Type A and D," Pamphlet, 2007, pp. 1-2.
W.R. Grace, "Material Safety Data Sheet, Product Name WRDS 64 CR-2409," Jun. 19, 2009, pp. 1-4.
Grace Concrete Products, "ADVA 190, High-range water-reducing admixture, ASTM C494 Type A and F, and ASTM C1017 Type I," Pamphlet, 2007, pp. 1-2.
W.R. Grace, "Material Safety Data Sheet, Product Name ADVA 190," Apr. 18, 2007, pp. 1-4.
Grace Concrete Products, "Recover Hydration Stabilizer, ASTM C494 Type D," Pamphlet, 2007, pp. 1-2.
W.R. Grace, "Material Safety Data Sheet, Product Name RECOVER," Jan. 20, 2009, pp. 1-4.
"Water reducer," Wikipedia, http://en.wikipedia.org/wiki/Water_reducer, retrieved Mar. 8, 2012 p. 1.
"Plasticizer," Wikipedia, http://en.wikipedia.org/wiki/Plasticizer, retrieved May 3, 2011, pp. 1-6.

(56) References Cited

OTHER PUBLICATIONS

"Plasticizer," Wikipedia, http://en.wikipedia.org/wiki/Plasticizer, retrieved Mar. 8, 2012, pp. 1-6.
"Superplasticizer," Wikipedia, http://en.wikipedia.org/wiki/Superplasticizer, retrieved Mar. 8, 2012, pp. 1-2.
Dierkes et al., "Development and Investigation of a Pollution Control Pit for Treatment of Stormwater from Metal Roofs and Traffic Areas," 10th International Conference on Urban Drainage, Aug. 21-26, 2005, pp. 1-8, Copenhagen/Denmark.
Taghizadeh et al., "Feasibility Study of Water Purification Using Vertical Porous Concrete Filter," Int. J. Environ. Sci. Tech., 2007, pp. 505-512, vol. 4, No. 4.
Majersky, Gregory Michael, "Filtration of Polluted Waters by Pervious Concrete," power point presentation for 5th Annual RMSAWWA/RMWEA Student Research Conference, May 13, 2008, pp. 1-18.
"Stormwater Inlet Protection," Dane County Erosion Control and Stormwater Management Manual, Jan. 2, 2007, pp. I.S-13.1 to I.S-13.6.
"Section 5: Storm Drain Inlets," Hydraulic Design Manual: Storm Drain Inlets, retrieved Nov. 30, 2011, pp. 1-20, http://onlinemanuals.txtdot.gov/txdotmanuals/hyd/storm_drain_inlets.htm.
Wolfe, Bruce H., "Use of Storm Drain Inlet Filters and Oil/Water Separators to Meet the Requirements of NPDES Municipal Stormwater Permits," Letter from California Regional Water Quality Control Board to BASMAA Managers, Aug. 5, 2004.
Suntree Technologies, Inc., "Grate Inlet Skimmer Box" pamphlet, pp. 1-6.
Clean Way pamphlet, "High Performance Catch Basin Filtration Inserts," pp. 1-4.
Pitt et al., "Module 10b: Gutter and Inlet Designs and Multiple Design Objectives," power point presentation, pp. 1-11.
Filterra Bioretention Systems pamphlet, p. 1.
Metropolitan Council/Barr Engineering Co., "Inlet Protection," Minnesota Urban Small Sites BMP Manual, 2000, pp. 3-113 to 3-120.
Suntree Technologies, Inc., "Curb Inlet Basket" pamphlet, pp. 1-2.
Revel Environmental Manufacturing, Inc., "Triton Filter Curb Inlet Filter Insert" pamphlet, pp. 1-2.
Dauphin County Conservation District, Best Management Practices Fact Sheet Inlet Protection, p. 1.
Precast Solutions pamphlet, "Stormwater Treatment Drain Inserts," pp. 1-2.
Royal Environmental Systems Inc., pamphlet, "ecoStorm plus treatement process characteristics," pp. 14.
Pollution Solution, Inc., Silt Sifter Bag pamphlet, "Sediment/Erosion Control Done Right," pp. 1-2.
Pollution Solution, Inc., Silt Sifter Tube pamphlet, "Sediment/Erosion Control Done Right," pp. 1-2.
Pollution Solution, Inc., Gravel Bags pamphlet, "Sediment/Erosion Control Done Right," pp. 1-2.
Pollution Solution, Inc., Curb Inlet Filter pamphlet, "Sediment/Erosion Control Done Right," pp. 1-2.
Pollution Solution, Inc., YellowJacket Drain Inlet Filter pamphlet, "Sediment/Erosion Control Done Right," pp. 1-2.
Pollution Solution, Inc., Hornet's Nest Drain Inlet Filter pamphlet, "Sediment/Erosion Control Done Right," pp. 1-2.
Pollution Solution, Inc., Above Ground Grated Filter (AGG Filter) pamphlet, "Sediment/Erosion Control Done Right," pp. 1-2.
Pollution Solution, Inc., Solid Frame Filter pamphlet, "Sediment/Erosion Control Done Right," pp. 1-2.
Pollution Solution, Inc., D-Watering Bag pamphlet, "Sediment/Erosion Control Done Right," pp. 1-2.
Pollution Solution, Inc., Silt Sifter D-Watering Sleeve pamphlet, "Sediment/Erosion Control Done Right," pp. 1-2.
Pollution Solution, Inc., Straw Wattle pamphlet, "Sediment/Erosion Control Done Right," pp. 1-3.
Jensen Precast, "Ditch Box 18"×36" Curb Inlet Fabricated Frame & Grate," Nov. 24, 2004, p. 1.
Jensen Precast, "No. 243 Curb Inlet with Frame and Cover," Apr. 2, 2008, p. 1.
Jensen Precast, "Curb Inlet and Catch Basin City of West Sacramento Detail 301," Apr. 11, 2007, p. 1.
Jensen Precast, "Curb Inlet 33" I.D. With 5" Walls (Curb Poured in Field)," Oct. 1, 2009, p. 1.
Jensen Precast, "Curb Inlet Sacramento County Type G," Apr. 11, 2007, p. 1.
Jensen Precast, "2436-1A 24"×36" Curb Inlet with Cast Iron Hood, Fabricated Frame & Grate," Apr. 3, 2008, pp. 1-2.
Jensen Precast, "2436-4R 24"×36" Curb Inlet with Cast Iron Frame, Grate, and Hood," Apr. 4, 2008, pp. 1-2.
Jensen Precast, "Type A Curb Inlet 3636 Material up to 6 Foot Depth," Mar. 3, 2010, p. 1.
Jensen Precast, "Type A Curb Inlet 48" Manhole Material Greater than 6 Foot Depth," Mar. 3, 2010, p. 1.
Jensen Precast, "Type C Field Inlet 2436 Material up to 4 Foot Depth," Feb. 15, 2010, p. 1.
Jensen Precast, "Type C Field Inlet 48" manhole Material Greater Than 4 Foot Depth," Mar. 3, 2010, p. 1.
Jensen Precast, "DI2436 24"×36" Curb Inlet With Cast Iron Frame Grate, and Hood," Sep. 6, , 2001, pp. 1-2.
Jensen Precast, "2436 Curb Inlet 24"×36" Curb Inlet With Cast Iron Hood, Fabricated Frame & Grate," Apr. 23, 2003, p. 1.
International Preliminary Report on Patentability corresponding to Application No. PCT/US2013/076804 dated Jun. 23, 2015.

\* cited by examiner

FAST-CURING PERVIOUS CONCRETE MIX

CROSS REFERENCE TO RELATED APPLICATIONS

This application is a nonprovisional of provisional Application No. 61/740,863 filed Dec. 21, 2012, the disclosure of which is being incorporated herein by reference in its entirety for all purposes.

BACKGROUND

Pervious concrete, also referred to as porous concrete, permeable concrete, no-fines concrete, gap-graded concrete, or enhanced-porosity concrete, is a composite material comprising coarse aggregate, Portland cement, and water. The coarse aggregate is bonded together at its points of contact by a layer of paste formed by the cement and water, forming a connected network of open pores or voids that lets fluids drain through the cured material. Pervious concrete mixes typically include the same materials as are used in ordinary concrete mixes, but in different proportions. In pervious concrete, water and cementitious material are combined such that a thick paste coats the aggregate particles. Fine aggregates is reduced or eliminated, and a narrowly sized coarse aggregate is used. The reduced cementitious paste content and absence of fine aggregates prevent close packing between the coated coarse aggregate particles, and a hardened structure containing open and connected voids is obtained.

Pervious concrete allows rainwater to percolate through a formation into the ground below. By capturing rainwater and allowing it to seep into the ground, pervious concrete helps to reduce stormwater runoff contamination in downstream waterways and to recharge groundwater supplies. Sensitivity to the adverse effects of stormwater contamination has greatly expanded the use of pervious concrete. EPA regulations under the federal Clean Water Act, as well as regional, state, and local standards, increasingly incorporate the use of pervious concrete as a best management practice to reduce stormwater runoff and improve water quality. Thus demand for pervious concrete continues to grow as a material of choice for parking lots, driveways, pedestrian paths, walkways, sidewalks, plazas, borders, pavement, retaining walls, and other structures that accumulate and discharge stormwater into the environment.

The mix characteristics of pervious concrete require careful placement and curing to maximize strength and durability of a pervious formation. The reduced cementitious content of pervious mixes produces concrete having relatively lower strength than non-pervious formations, but requiring more curing time to develop sufficient strength to withstand loading. At the same time, the thin coating of paste on the aggregate, the open structure, and the rough surface of pervious concrete increase evaporation of the water in the paste needed for the bonding reactions of the cement. To cure correctly, pervious concrete are moistened and covered typically for at least seven days. For pavement applications that will see traffic in service, it is generally recommended that the pavements not be opened to construction or public traffic for seven days, and continuous curing is recommended until the pavement is opened, disrupting work schedules, delaying project completion, and increasing costs. See, e.g., ACI 522.1-08, Specification for Pervious Concrete Pavement, published by the American Concrete Institute. A need remains for a pervious concrete mix that can cure to load-bearing strength more quickly and be opened to traffic sooner than current mixes allow.

SUMMARY

The present invention is directed to a fast-curing pervious concrete mix. A first embodiment, according to aspects of the invention, is therefore a fast-curing pervious concrete mix made by combining water, a cementitious material comprising portland cement and a supplementary cementitious material, aggregate sized to form a pervious concrete, a water reducer, a quantity of fibers, and a polymeric bonding agent, the mix curing to a compressive strength of at least 2,000 psi within 24 hours of placement.

A further preferred embodiment, according to aspects of the invention, is a fast-curing pervious concrete mix according to the previous embodiment, made by combining 400 to 700 lbs/yd$^3$ of the cementitious material, 2000 to 3000 lbs/yd$^3$ of the aggregate, 1 to 20 oz/cwt/yd$^3$ of the water reducer, 0.5 to 2.5 lbs/yd$^3$ of the fibers, and 0.5 to 1.5 gal/yd$^3$ of the polymeric bonding agent.

A further preferred embodiment, according to aspects of the invention, is a fast-curing pervious concrete mix according to the first embodiment summarized above, wherein the supplementary cementitious material is fly ash.

A further embodiment, according to aspects of the invention, is a pervious concrete, obtained by placing and curing a fast-curing pervious concrete mix made by combining water, a cementitious material comprising portland cement and a supplementary cementitious material, aggregate sized to form a pervious concrete, a water reducer, a quantity of fibers, and a polymeric bonding agent, the mix curing to a compressive strength of at least 2,000 psi within 24 hours of placement.

A further embodiment, according to aspects of the invention, is a method of producing pervious concrete, comprising the steps of forming a mix by combining water, a cementitious material comprising portland cement and a supplementary cementitious material, aggregate sized to form a pervious concrete, a water reducer, a quantity of fibers, and a polymeric bonding agent, placing the mix in a desired formation, and curing the placed mix to a compressive strength of at least 2000 psi within 24 hours of placement.

These and other features, aspects, and advantages of the present invention will become better understood with reference to the following description and appended claims.

DETAILED DESCRIPTION

Generally, a pervious concrete mix according to aspects of the present invention contains the following basic ingredients: water, a cementitious material including portland cement and a supplementary cementitious material, aggregate, a water reducer, a quantity of fibers, and a polymeric bonding agent. A typical mix design according to aspects of the invention includes at least 400 lbs/yd$^3$ up to 700 lbs/yd$^3$ of cementitious material, at least 2000 lbs/yd$^3$ up to 3000 lbs/yd$^3$ of aggregate sized for pervious concrete having a void content of about 15% to about 25% and a permeability of about 5 gal/ft$^2$-min, water at a weight ratio to cementitious material of at least 0.25 up to 0.40, 2 to 20 oz/cwt/yd$^3$ of the water reducer, 0.5 to 2.5 lbs/yd$^3$ of the fibers, and 0.5 to 1.5 gal/yd$^3$ of the polymeric bonding agent.

However, it will be understood by those of ordinary skill that the sizes and quantities described herein may be varied according to the demands and requirements of a particular application and are not intended to limit of this or any other embodiment of the invention except as expressly described or claimed. A general description of pervious concrete mix designs is found in Design Guide 211 published by the American Concrete Institute (ACI). Variation may be required to obtain a desired porosity in view of available materials or to obtain a desired strength in view of acceptable porosity.

Water

Water is an essential element of any concrete mix, as a reactant in the hydration reaction that characterizes the transformation of cementitious materials into concrete. In the fast-curing pervious concrete mixes according to aspects of the present invention, water is incorporated in a weight ratio to cementitious material of at least 0.25, preferably at least 0.26, even more preferably at least 0.27, up to 0.40, preferably up to 0.39, 0.38, 0.37, 0.36, 0.35, 0.34, 0.33, 0.32, 0.31, or 0.30. Typical ratios of water to cementitious material include 0.25 to 0.40, 0.26 to 0.38, and 0.27 to 0.30. Suitable water to cementitious ratios further include 0.34 to 0.40, 0.27 to 0.43, and 0.27 to 0.38. The water to cementitious ratio according to aspects of the present invention may range between any combination of the lower and upper limits disclosed herein.

A particularly preferred range of water to cementitious material is 0.27 to 0.30. However, water to cementitious ratios of up to 0.40 and higher, such as up to 0.43, may be used, as determined by those of skill according to conditions or demands of a particular application or placement.

Cementitious Material

For the purpose of this invention and as employed herein, the terms "cementitious" and "cement" are used in a generic sense to broadly refer to silicate materials that set and harden upon hydration, also known as hydraulic cements. Of all the hydraulic cements, Portland cement is most widely used. The cementitious material of the present invention comprises both Portland cement and a supplementary cementitious material.

Portland Cement

Portland cement is produced by heating a homogeneous mixture of raw materials, such as a mixture of limestone and clay or shale, or other calcareous and argillaceous materials, to a fused or sintered state. The fused material, known as "clinker," typically takes the form of nodules of approximately 0.2 to 1 inch size. The four principal chemical constituents of Portland cement clinker are tricalcium silicate, dicalcium silicate, tricalcium aluminate and tetracalcium aluminoferrite. The major raw material for the clinker is usually limestone ($CaCO_3$) mixed with a secondary material containing clay as a source of alumino-silicate. The $CaCO_3$ content of limestones can be as low as 80%. Normally, an impure limestone that contains clay or $SiO_2$ is used. Secondary raw materials (materials other than limestone) will depend on the purity of the limestone. Some typical secondary raw materials include clay, shale, sand, iron ore, bauxite, fly ash, and slag. When a cement kiln is fired by coal, the ash of the coal can act as a secondary raw material. A typical Portland clinker will contain, on a weight basis, 45% to 75% of tricalcium silicate $((CaO)_3.SiO_2; C_3S)$, 5% to 35% dicalcium silicate $((CaO)_2.SiO_2; C_2S)$, up to 15% tricalcium aluminate $((CaO)_3.Al_2O_3; C_3A)$, and up to 20% tetracalcium aluminoferrite $((CaO)_4.Al_2O_3.Fe_2O_3; C_4AF)$, and optionally up to 10% gypsum ($CaSO_4.2H_2O$).

A finished Portland cement is typically produced by finely grinding more than 90% by weight of the clinker with minor amounts of other constituents as allowed by various standards. A typical Portland cement will contain, on a weight basis, 60% to 70% calcium oxide (CaO), 15% to 25% silicon oxide ($SiO_2$), 2% to 10% aluminum oxide ($Al_2O_3$), up to 6% ferric oxide ($Fe_2O_3$), and 1.5% to 4.5% sulfate. Suitable Portland cements for use according to aspects of the invention include ASTM C150 Types I-V and EN-197 Classes I-V Portland cements. Still other suitable hydraulic cements will be known to those of skill in the art from the description herein.

Supplementary Cementitious Materials

The cementitious material of the present invention also includes a supplementary cementitious material, preferably a pozzolan. Pozzolans are siliceous and aluminous materials, natural or artificial, processed or unprocessed, that contain non-cementitious materials that, in finely divided form and in the presence of moisture, react with calcium hydroxide to form relatively stable and water insoluble compounds having cementitious properties. Pozzolans contribute strength to concrete by reacting with the calcium hydroxide ($Ca(OH)_2$) that is liberated by the Portland cement, when it reacts with water, and forms reaction products similar to those produced by the cement-water reaction. The chemical reaction between the pozzolan and the calcium hydroxide is often referred to as the "pozzolanic reaction." The pozzolanic reaction is relatively slow one, and the strength contributed by the pozzolan is not significant until the concrete ages at least a week after being placed.

Natural pozzolans may be derived from volcanic rocks and include pumicites or colcanic ashes, pumice or pumice stone, obsidian, scoria, tuffs and some of the andesites, or they may be derived from rocks in which the silica has a high opaline content including diatomites or diatomaceous earths, cherts, shale, clays and pure opal. Raw or calcined natural pozzolans include such materials as diatomaceous earths, opaline cherts and shales, tuffs, and volcanic ashes. Man-made pozzolans are typified by fly ash, the finely divided residue that results from the combustion of coal, and blast furnace slag. Other so-called artificial pozzolans include flue dust, boiler and furnace slags, burnt ground brick, and by-products of certain industrial processes.

A particularly preferred supplemental cementitious material is fly ash. Fly ash is a well-known material generated as a by-product in the combustion of fine coal as a fuel in power plant boilers. Being finely divided and highly siliceous, fly ash forms a slowly-hardening cement with water and hydrated lime.

The amount of supplementary cementitious material in the concrete mix according to aspects of the present invention will vary depending upon the desired end properties of the concrete. The lower limit according to aspects of the invention can be at least 10% by weight of the total cementitious material included in the mix, preferably at least 11%, 12%, 13%, 14%, 15%, 16%, 17%, 18%, 19%, or 20% by weight of the total cementitious material. The upper limit according to aspects of the invention can be up to 30% by weight of the total cementitious material included in the mix, preferably up to 29%, 28%, 27%, 26%, or 25% of the total cementitious material. Fly ash as the supplementary cementitious material is typically incorporated at about 20% of the total cementitious material in the mix. One hundred pounds of a typical Type I Portland cement will produce enough calcium hydroxide during its reaction with water to react with about 20 pounds of a typical fly ash.

The cementitious materials comprising Portland cement and the supplementary cementitious material are incorporated into the fast-curing pervious concrete mix according to aspects of the present invention in an amount of at least 300 lbs/yd$^3$, preferably at least 350 or 400 lbs/yd$^3$, more preferably at least 450 lbs/yd$^3$, up to 700 lbs/yd$^3$, preferably up to 650 lbs/yd$^3$, more preferably up to 600 lbs/yd$^3$. The cementitious material content according to aspects of the present invention may vary within the ranges defined by any combination of the lower and upper limits disclosed herein.

Aggregate

Aggregate is generally understood to include both fine aggregate, such as sand, and coarse aggregate, such as gravel and stone, and both are generally found in conventional concrete mixes. The porosity and permeability of pervious concrete according to aspects of the invention is achieved by reducing or eliminating the fine aggregate of a normal concrete mix, leaving interconnected voids between the larger pieces of aggregate that allow fluid to penetrate and flow through the formation. The aggregate according to aspects of the present invention is sized to form a pervious concrete.

Suitable aggregates according to aspects of the present invention include river gravel or crushed stone having a size ranging from aggregate retained on a No. 4 sieve to ¾" or larger, including ⅜", ½", ¾", 1", 1½", or larger. Preferably, the aggregate according to aspects of the invention contains no particles smaller than ¹⁄₁₆" (0.0625"). The aggregate is included in the pervious concrete mixes according to aspects of the invention in a weight ratio to the cementitious material of about 4 to about 4.5.

While the No. 4 sieve is sometimes recognized as a demarcation between coarse and fine aggregates, pervious concretes may be obtained with smaller aggregates, including aggregates retained on a No. 6 or even a No. 8 sieve. The aggregate according to aspects of the present invention does not necessarily exclude any particular size of aggregate, provided the void content and porosity necessary for permeability are present as well. Similarly, while a mix producing a pervious structure may be obtained by excluding fine aggregates entirely, the aggregate according to aspects of the present invention does not require such exclusion, again provided the void content and porosity necessary for permeability are present as well. Thus according to certain embodiments of the invention, aggregate includes or may be amended to include an acceptable quantity of fines or sand provided desired or accepted porosity and permeability are obtained in the finished placement.

The void content of pervious concrete according to aspects of the present invention typically ranges from 15% to 35% by volume. The lower limit of void content in a pervious concrete according to aspects of the present invention can be as low as at least 10% by volume, preferably at least 11%, 12%, 13%, 14%, 15%, 16%, 17%, 18%, 19%, or 20% by volume. The upper limit of void content in the pervious concrete according to aspects of the present invention can be up to 35% by volume or more, preferably up to 34%, 33%, 32%, 31%, 30%, 29% m, 28%, 27%, 26%, or 25% by volume. A pervious concrete according to aspects of the present invention may have a hydraulic conductivity (coefficient of permeability) of about 30 in/hr up to about 900 in/hr, with 480 in/hr (0.34 cm/sec, corresponding to about 5 gal/ft$^2$-min or 200 L/m$^2$-min) being typical.

Care must be exercised in the selection of aggregates for use in mixes according to aspects of the invention. Because of the relatively low content of cementitious paste in the inventive mixes, the properties and performance of the mix may be affected by water entering the mix as moisture content of the aggregate. An ideal mix is characterized as having an oily or metallic sheen on the cementitious paste and a consistency such that a handful of the paste when squeezed will neither stick excessively nor separate completely from the hand, leaving only a scattering of aggregate and paste on the surface.

Water Reducer

Pervious concrete mixes according to aspects of the present invention further include one or more compounds or compositions or admixtures referred to herein generally as a "water reducer." Included within the scope of water reducers according to aspects of the present invention are ASTM C494 Types A (water-reducing admixtures), D (water-reducing and retarding admixtures), F (water-reducing, high range admixtures), and G (Water-reducing, high range, and retarding admixtures), though these classifications are not intended to be limiting. Other terms used to refer to materials exemplary of the water reducer of the present invention include "plasticizers," "super plasticizers," or "set retarders." Suitable examples of water reducers include lignosulfonic acid, gluconic acid, adipic acid, tetrahydroxyadipic acid, or salicylic acid, as well as their salts, for example their calcium, sodium, potassium, calcium, magnesium, or ammonium salts typically, though not to exclude other suitable salt-forming cations. Other suitable water reducers include salts of hydroxylated carboxylic acids, sugars, corn syrups, and other carbohydrates.

Typical of the water-reducers labeled as water-reducing agents or water-reducing admixtures are aqueous solutions of lignosulfonic acid or its salts. The lignosulfonic acid salts can be salts of any alkali metal such as sodium or potassium, or of an alkaline earth metal such as calcium or magnesium. The preferred salts are magnesium or calcium lignosulfonate. These salts are commonly obtained as by-products of conventional sulfite wood-pulping operations. The desired water-reducing admixture according to aspects of the present invention can be formed from the lignosulfonate salts either as a purified product or as an unpurified product obtained as a by-product of wood-pulping operations.

The use of the unpurified salts may be preferred because they avoid costly purification processing while not detracting from the effectiveness of the admixture. The unpurified salts can contain by-products normally associated with their production, such as monosaccharides, for example, xylose, mannose, glucose, fructose, and the like. These sugar by-products can be present in from about 3 to 30 percent by weight based on the weight of lignosulfonate, as is normally encountered in sulfite process effluent. The additional sugar can also be in the form of a corn syrup such as commercial high fructose corn syrup which contains up to about a 1:1 ratio of fructose to glucose therein with normally less than about five percent polysaccharides.

The water reducers known as superplasticizers, also known as high range water reducers, are typically chemical admixtures used to improve particle dispersion or suspension, to avoid particle aggregation, and to improve the rheology of the uncured concrete mix. Superplasticizers have generally been manufactured from sulfonated naphthalene condensate or sulfonated melamine formaldehyde, as well as polycarboxylic ethers. Lignin, naphthalene, and melamine sulfonate-based water reducers are believed to disperse flocculated cement particles through a mechanism of electrostatic repulsion, wherein the long molecules wrap themselves around the cement particles and give them a highly negative charge so that they repel each other. Polycarboxylate ether and polycarboxylate superplasticizers are believed to work differently, dispersing by steric stabilisation, instead of electrostatic repulsion.

A water-reducing admixture useful in the pervious concrete mixes according to aspects of the invention is available from W.R. Grace & Co. under the mark WRDA® 64 Water-reducing admixture. WRDA® 64 Water-reducing admixture is classified under ASTM C494 Types A and D, and is available in the form of an aqueous solution composed primarily of calcium lignosulfonate, corn syrup, and triethanolamine. WRDA® 64 Water-reducing admixture or a similar lignosulfonate-based water reducer may be included in a pervious concrete mix according to aspects of the present invention in an amount of 1 to 10 ounces per hundred pounds of cementitious material per cubic yard of mix (oz/cwt/yd$^3$), preferably at least 1 oz/cwt/yd$^3$, preferably up to 9, 8, 7, 6, 5, 4, or 3 oz/cwt/yd$^3$, more preferably about 2 oz/cwt/yd$^3$.

Another exemplary water-reducing admixture according to aspects of the invention is available from W. R. Grace & Co. under the mark ADVA® 190 High-range water-reducing admixture. ADVA® 190 High-range water-reducing admixture is classified under ASTM C494 Types A and F, as well as ASTM C1017 Type I (Plasticizing chemical admixtures), and is available in the form of an aqueous solution composed primarily of carboxylated polyether (polyacrylate) polymer and sodium gluconate. ADVA® 190 High-range water-reducing admixture or a similar polyacrylate/gluconate high-range water-reducing admixture may be included in a pervious concrete mix according to aspects of the present invention in an amount of at least 1, preferably at least 2, 3, 4, 5, or 6 oz/cwt/yd$^3$, up to 15, preferably 14, 13, 12, 10, 9, or 8 oz/cwt/yd$^3$, more preferably about 7 oz/cwt/yd$^3$.

Another exemplary water-reducing admixture according to aspects of the invention is available from W. R. Grace & Co. under the mark RECOVER® Hydration stabilizer. RECOVER® Hydration stabilizer is classified under ASTM C494 Type D and is available in the form of an aqueous solution composed primarily of sodium gluconate and sucrose. RECOVER® Hydration stabilizer or a similar gluconate/sugar-based hydration stabilizer may be included in a pervious concrete mix according to aspects of the present invention in an amount of 1 to 10 oz/cwt/yd$^3$, preferably at least 1 oz/cwt/yd$^3$, preferably up to 9, 8, 7, 6, 5, 4, or 3 oz/cwt/yd$^3$, more preferably about 2 oz/cwt/yd$^3$.

Further exemplary water reducers suitable for use in a pervious concrete mix according to aspects of the invention are described in U.S. Pat. No. 3,351,478, No. 4,205,993, No. 4,318,744, No. 4,978,392, and No. 5,665,158, the entire disclosures of which are incorporated herein by reference. The total quantity of water reducers incorporated into a mix according to aspects of the invention may range from at least 1 oz/cwt/yd$^3$ up to 20 oz/cwt/yd$^3$, preferably from at least 2, 3, 4, 5, 6, 7, 8, 9, or 10 oz/cwt/yd$^3$ up to about 19, 18, 17, 16, 15, 14, 13, or 12 oz/cwt/yd$^3$, more preferably about 11 oz/cwt/yd$^3$.

Fibers

Pervious concrete mixes according to aspects of the present invention further include a quantity of fibers. Fibers suitable for use in the concrete mixes according to aspects of the invention come in an array of various sizes, shapes, and dimensions. They may be in monofilament, multifilament, collated, fibrillated, ribbon-shaped, or any other suitable form or shape. Exemplary fibers according to aspects of the invention comprise steel, glass, carbon fiber, cellulose, rayon, or synthetic materials, such as polyolefins, nylon, polyester, and acrylics. Polyolefins, such as polypropylene or polyethylene, are preferred. Particularly referred fiber products for use in concrete mixes according to one aspect of the present invention are available from Propex Concrete Systems under the marks FIBERMESH® microsynthetic fibers, NOVOMESH® blended synthetic fibers, and ENDURO® macrosynthetic fibers. FIBERMESH®, NOVOMESH®, and ENDURO® synthetic fibers are composed of graded multifilament polypropylene fibers treated with fatty acid and/or ester lubricants and other proprietary additive materials.

The surface of the fibers to be included in concrete mixes according to aspects of the present invention may be treated to promote dispersion of the fibers in the inventive mixes. Polyolefin fibers, due to the nature of the material, tend to be hydrophobic and may require a coating to impart surface tension properties that allow the fibers to disperse more easily within the aqueous concrete mix. For example, U.S. Pat. No. 5,399,195 discloses polyolefin fibers that are treated with a wetting agent by passing filament bundles through lubricant application rollers. The wetting agent may be selected from wetting agents normally applied to synthetic fibers to render them hydrophilic, such as emulsifiers, surfactants, detergents, and mixtures thereof. Examples include fatty acid esters of glycerides, fatty acid amides, polyglycol esters, polyethoxylated amides, non-ionic surfactants, and cationic surfactants. U.S. Pat. No. 5,753,368 discloses setting agents such as emulsifiers, detergents, and surfactants to render fiber surfaces more hydrophilic and thus more susceptible to mixing in wet concrete. The disclosures of U.S. Pat. No. 5,399,195 and U.S. Pat. No. 5,753,368 are incorporated herein by reference in their entirety.

Dispersion within the mix matrix, as well as other properties of the fibers, may also be influenced by varying or modifying the shape or form of the fibers. U.S. Pat. No. 6,197,423 (incorporated herein by reference in its entirety) discloses mechanically-flattened fibers having varying width and/or thickness dimensions and microscopic stress-fractures. The discontinuities and irregular and random displacements on the surface of the individual fibers resulting from the flattening process are believed to improve bonding between cement and fibers and to reduce fiber-to-fiber entanglement (and hence fiber balling). Other treatments for improving concrete fiber performance include embossing with wheels to create patterned discontinuities on the fiber surfaces or bending the fibers into wave shapes.

The fibers may be introduced into the inventive mixes according to aspects of the invention in a variety of ways, among them insoluble packaging, soluble packaging, and various packaging conformations, for example, bundling. Suitable methods and materials are disclosed in U.S. Pat. No. 5,224,774, No. 4,961,790, and No. 5,807,458, as well as PCT Publication No. WO 00/49211, the entire disclosures of which are incorporated herein by reference. According to one preferred aspect of the present invention, polyolefin fibers are incorporated into a pervious concrete mix in an amount of at least 0.5 lbs/yd$^3$, preferably at least 0.6, 0.7, 0.8, or 0.9 lbs/yd$^3$, up to 2.5 lbs/yd$^3$, preferably up to 2.4, 2.3, 2.2, 2.1, 2.0, 1.9, 1.8, 1.7, 1.6, 1.5, 1.4, 1.3, 1.2, or 1.1 lbs/yd$^3$, more preferably about 1 lbs/yd$^3$.

Polymeric Bonding Agent

Pervious concrete mixes according to aspects of the present invention further contain a polymeric bonding agent comprising a polymer selected from the group consisting of polyvinyl acetate, polyvinyl alcohol, vinyl acetate-dibutyl maleate copolymer, and mixtures thereof. Various grades of these polymers are available, which differ primarily in their molecular weight. A suitable bonding agent according to a preferred aspect of the invention is available from W. R. Grace & Co. under the mark DARAWELD® C. DARAWELD® C bonding agent is an aqueous latex dispersion containing about 25% to 50% by weight of polyvinyl acetate, about 1% to 10% by weight of polyvinyl alcohol, and about 25% to 50% by weight of vinyl acetate-dibutyl maleate copolymer, based on the latex exclusive of water. The amount of polymeric bonding agent incorporated into the mixes according to aspects of the invention may vary depending on the concentration of polymers in the particular bonding agent.

DARAWELD® C bonding agent may be incorporated into a pervious concrete mix according to aspects of the present invention in an amount of at least 0.5 gallons per cubic yard of mix (gal/yd$^3$), preferably at least 0.6, 0.7, 0.8, or 0.9 gal/yd$^3$, up to 1.5 gal/yd$^3$, preferably up to 1.4, 1.3, 1.2, or 1.1 gal/yd$^3$, most preferably about 1 gal/yd$^3$.

Placement and Curing

Placement and curing of pervious concreted mixes according to aspects of the present invention generally follow current practice in placement and curing of conventional pervious concrete mixes. The time from placement until the formation is covered for curing should generally not exceed about twenty minutes. All efforts should be made to eliminate loss of moisture from the material, including misting or spraying of water over the formation to inhibit evaporation. Finishing with trowels and the like is to be avoided, again to avoid sealing the formation surface and reducing permeability. Application of an evaporation retarder, such as soybean oil, to the top of the placed formation before covering also aids in preventing moisture loss. The formation is then tightly covered with a heavy impermeable barrier, typically polyethylene film of 6 mil or greater weight.

Curing of conventional pervious concrete mixes is begun quickly after placement and continues uninterrupted for at least seven days before being opened to construction or public traffic. Pervious concrete mixes according to aspects of the present invention, by contrast, greatly reduce the time required to cure a formation before being opened to construction or pubic traffic. Therefore, in a further embodiment according to aspects of the invention, a method of producing pervious concrete comprises the steps of: 1) forming a pervious concrete mix according to the invention by combining water, a cementitious material comprising portland cement and a supplementary cementitious material, aggregate sized to form a pervious concrete, a water reducer, a quantity of fibers, and a polymeric bonding agent; 2) placing the mix in a desired formation; and 3) curing the placed mix to a compressive strength of at least 2000 psi within 24 hours of placement. There is no generally established method for determining the compressive strength of pervious concrete formations, but the compressive strength of pervious concrete formations according to the invention may be determined by, for example, ASTM C 39, Standard Test Method for Compressive Strength of Cylindrical Concrete Specimens, or a similar methodology.

In a further embodiment according to aspects of the invention, a pervious concrete mix according to the invention is placed in a desired formation, the placed mix is optionally leveled (but not sealed, to retain permeability), and optionally compacted. The compaction may be carried out using conventional rollers, but preferred techniques include vibration compacting or compaction with a hydraulic roller, preferably with manual compaction near joints and edges of the formation.

It a further embodiment according to aspects of the invention, a curing compound may be applied to the surface of the placed materials before curing begins. The purpose of the curing compound is to accelerate curing of the cementitious material before significant loss of moisture occurs. Suitable curing compounds include calcium chloride and lithium silicate. Other suitable curing compounds are described in, for example, US 2010/0285224, the entire disclosure of which is incorporated herein by reference.

Although the invention has been described in terms of preferred embodiments and certain specific embodiments, it will be apparent to those skilled in the art that in accordance with the broader aspects of the invention, various modifications and other embodiments are possible. Accordingly, it is to be understood that the invention is not limited to the specific embodiments described, but includes all equivalent embodiments and modifications that come within the scope of the invention, and that those skilled in the art will recognize that aspects of the invention can be practiced with modification within the spirit and scope of the appended claims.

What is claimed:

1. A fast-curing pervious concrete mix made by combining, per cubic yard of the mix:
    (a) 15 to 25 gallons of water;
    (b) 400 to 700 pounds of a cementitious material comprising:
        (1) 70% to 90% by weight of portland cement; and
        (2) 10% to 30% by weight of a supplementary cementitious material;
    (c) 2000 to 3000 pounds of aggregate sized to form a pervious concrete;
    (d) a water reducer, wherein the water reducer comprises a lignosulfonate, amine, carbohydrate, carboxylated polyether, hydroxycarboxylic acid salt, or any mixture thereof;
    (e) 0.5 to 2.5 pounds of fibers; and
    (f) 0.5 to 1.5 gallons of a polymeric bonding agent,
    the mix curing to a compressive strength of at least 2,000 psi within 24 hours of placement.

2. The mix of claim 1, having a water to cementitious material ratio of 0.25 to 0.40.

3. The mix of claim 2, having a water to cementitious material ratio of 0.27 to 0.38.

4. The mix of claim 3, having a water to cementitious material ratio of 0.27 to 0.30.

5. The mix of claim 1, wherein the supplementary cementitious material comprises fly ash.

6. The mix of claim 1, wherein the supplementary cementitious material comprises a pozzolan.

7. The mix of claim 6, wherein the pozzolan is pumicite, volcanic ash, pumice, pumice stone, obsidian, scoria, tuff, andesite, diatomite, diatomaceous earth, chert, shale, clay, opal, fly ash, flue dust, slag, or any mixture thereof.

8. The mix of claim 7, wherein the pozzolan comprises fly ash.

9. The mix of claim 1, wherein the aggregate comprises substantially no particles smaller than 0.0625 in.

10. The mix of claim 1, having a weight ratio of aggregate to cementitious material of about 4 to about 4.5.

11. The mix of claim 1, wherein the fibers comprise one or more natural or synthetic fibers.

12. The mix of claim 11, wherein the synthetic fibers comprise one or more polyolefins.

13. The mix of claim 12, wherein the polyolefins comprise polypropylene.

14. The mix of claim 1, wherein the polymeric bonding agent comprises polyvinyl acetate, vinyl acetate/dibutylmaleate copolymer, or any mixture thereof.

15. The mix of claim 1, having a void content of 15% to 35% by volume after placement.

16. The mix of claim 15, having a void content of 20% to 30% by volume after curing.

17. The mix of claim 1, made by combining 400 to 700 lbs/yd$^3$ of the cementitious material, 2000 to 3000 lbs/yd$^3$ of the aggregate, and 1 to 20 oz./cwt. of the water reducer.

18. The mix of claim 17, made by combining 450 to 650 lbs/yd$^3$ of the cementitious material, 2250 to 2750 lbs/yd$^3$ of the aggregate, 2 to 15 oz./cwt. of the water reducer, 0.75 to 2.25 lbs/yd$^3$ of the fibers, and 0.75 to 1.25 gal./yd$^3$ of the polymeric bonding agent.

19. A pervious concrete obtained by placing and curing the mix of claim 1.

20. A method of producing pervious concrete, comprising the steps of:
 a. forming a mix by combining, per cubic yard of the mix:
  (1) 15 to 25 gallons of water;
  (2) 400 to 700 pounds of a cementitious material comprising:
   (a) 70% to 90% of portland cement; and
   (b) 10% to 30% by weight of a supplementary cementitious material;
  (3) 2000 to 3000 of aggregate sized to form a pervious concrete;
  (4) a water reducer, wherein the water reducer comprises a lignosulfonate, amine, carbohydrate, carboxylated polyether, hydroxycarboxylic acid salt, or any mixture thereof;
  (5) 0.5 to 2.5 pounds a quantity of fibers; and
  (6) 0.5 to 1.5 gallons of a polymeric bonding agent;
 b. placing the mix in a desired formation; and
 c. curing the placed mix to a compressive strength of at least 2000 psi within 24 hours of placement.

21. A fast-curing pervious concrete mix made by combining, per cubic yard of the mix:
 (a) 15 to 25 gallons of water;
 (b) 400 to 700 pounds of a cementitious material comprising:
  (1) 70% to 90% by weight of portland cement; and
  (2) 10% to 30% by weight of flyash;
 (c) 2000 to 3000 pounds of aggregate sized to form a pervious concrete;
 (d) a water reducer, comprising:
  (1) 1 to 5 oz./cwt. of a water-reducing admixture comprising a lignosulfonate;
  (2) 5 to 10 oz./cwt. of a water-reducing admixture comprising a polyacrylate; and
  (3) 1 to 5 oz./cwt. of a water-reducing admixture comprising carbohydrate;
 (e) 0.5 to 2.5 pounds of fibers; and
 (f) 0.5 to 1.5 gallons of a polymeric bonding agent comprising polyvinyl acetate and vinyl acetate/dibutyl maleate copolymer,
the mix curing to a compressive strength of at least 2,000 psi within 24 hours of placement.

\* \* \* \* \*